United States Patent
Fedurco et al.

(10) Patent No.: US 10,549,580 B2
(45) Date of Patent: *Feb. 4, 2020

(54) POLYBENZOXAZINE THAT CAN BE USED FOR COATING METAL AND BONDING OF SAME TO RUBBER

(71) Applicant: COMPAGNIE GENERALE DES ETABLISSEMENTS MICHELIN, Clermont-Ferrand (FR)

(72) Inventors: Milan Fedurco, Clermont-Ferrand (FR); Marco Ribezzo, Clermont-Ferrand (FR)

(73) Assignee: COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/062,976

(22) PCT Filed: Dec. 5, 2016

(86) PCT No.: PCT/FR2016/053211
§ 371 (c)(1),
(2) Date: Jun. 15, 2018

(87) PCT Pub. No.: WO2017/103375
PCT Pub. Date: Jun. 22, 2017

(65) Prior Publication Data
US 2018/0370284 A1    Dec. 27, 2018

(30) Foreign Application Priority Data
Dec. 16, 2015 (FR) ..................... 15 62499

(51) Int. Cl.
*B60C 9/00* (2006.01)
*B60C 1/00* (2006.01)
(Continued)

(52) U.S. Cl.
CPC .............. *B60C 9/0007* (2013.01); *B60C 1/00* (2013.01); *C08G 73/0233* (2013.01);
(Continued)

(58) Field of Classification Search
CPC . B60C 9/0007; B60C 2009/0021; B60C 1/00; C09D 179/02; C09J 179/02;
(Continued)

(56) References Cited

U.S. PATENT DOCUMENTS 5,543,516 A    8/1996  Ishida
9,499,666 B2   11/2016 Ward et al.
(Continued)

FOREIGN PATENT DOCUMENTS

JP    2010-265480 A    11/2010
WO    2013/017423 A1   2/2007
(Continued)

OTHER PUBLICATIONS

Copending U.S. Appl. No. 16/062,990, filed Dec. 5, 2016 (available on USPTO system).

*Primary Examiner* — Shane Fang
(74) *Attorney, Agent, or Firm* — Venable LLP

(57) ABSTRACT

The repeat units of a polybenzoxazine comprise at least one unit corresponding to the formulae (I) or (II):

(Continued)

-continued

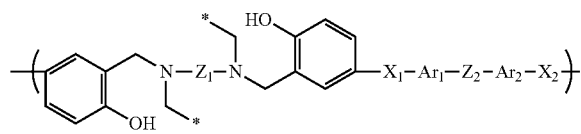
(II)

in which $Z_1$ represents an at least divalent, aliphatic, cycloaliphatic or aromatic bonding group comprising at least one carbon atom and optionally at least one heteroatom selected from O, S, N and P; $X_1$ and $X_2$, which are identical or different, represent O or S; $Ar_1$ and $Ar_2$, which are identical or different, represent a substituted or unsubstituted phenylene group; and $Z_2$ represents O or $(S)_n$, the symbol "n" representing an integer equal to 1 or greater than 1. Such a polybenzoxazine can be used as metal-adhesive layer, in particular for the adhesive bonding of a metal substrate, in particular made of carbon steel, to a rubber.

26 Claims, 17 Drawing Sheets

(51) Int. Cl.
  C08G 73/02 (2006.01)
  C09J 179/02 (2006.01)
  C09D 179/02 (2006.01)
(52) U.S. Cl.
  CPC .......... *C09D 179/02* (2013.01); *C09J 179/02* (2013.01); *B60C 2009/0021* (2013.01)

(58) Field of Classification Search
  CPC ... C09J 179/04; C09J 161/34; C08G 73/0233; C08G 73/06; C08G 14/06
  See application file for complete search history.

(56) References Cited

U.S. PATENT DOCUMENTS

| | | | |
|---|---|---|---|
| 9,617,372 B2 | 4/2017 | Fedurco et al. | |
| 9,845,376 B2 | 12/2017 | Fedurco et al. | |
| 2004/0068084 A1* | 4/2004 | Hwang | C07D 265/16 528/162 |
| 2007/0129509 A1 | 6/2007 | Li et al. | |
| 2014/0235124 A1 | 8/2014 | Doisneau et al. | |
| 2014/0235125 A1 | 8/2014 | Doisneau et al. | |
| 2014/0308864 A1 | 10/2014 | Doisneau et al. | |
| 2015/0259463 A1 | 9/2015 | Fedurco et al. | |
| 2015/0274878 A1 | 10/2015 | Fedurco et al. | |
| 2016/0122460 A1 | 5/2016 | Fedurco et al. | |
| 2016/0251550 A1 | 9/2016 | Michoud et al. | |

FOREIGN PATENT DOCUMENTS

| | | |
|---|---|---|
| WO | 2013/017421 A1 | 2/2013 |
| WO | 2013/148408 A1 | 10/2013 |
| WO | 2014/063963 A2 | 5/2014 |
| WO | 2014/063968 A1 | 5/2014 |
| WO | 2014/173838 A1 | 10/2014 |
| WO | 2014/173839 A1 | 10/2014 |
| WO | 2015/007641 A1 | 1/2015 |
| WO | 2015/007642 A1 | 1/2015 |
| WO | 2013/017422 A1 | 2/2017 |

* cited by examiner

Monomer M

Monomer M-1

Monomer M-2

Monomer M-3

Monomer M-4

Monomer M-5

Monomer M-6

2  Compound 1  +  Compound 2  +  Compound 3

Δ | Toluene/Ethanol (A-8)

Monomer M-8

Monomer M-8

POLYBENZOXAZINE THAT CAN BE USED FOR COATING METAL AND BONDING OF SAME TO RUBBER

FIELD OF THE INVENTION

The present invention relates to thermosetting resins, which can be used in particular in adhesive systems intended in particular for the adhesive bonding of metal to rubber.

The invention relates more particularly to the polymers with benzoxazine units or "polybenzoxazines" that can be used in particular as adhesive layers in metal/rubber composites intended for the manufacture of rubber articles such as pneumatic or non-pneumatic tyres, for motor vehicles.

PRIOR ART

Metal/rubber composites, in particular for motor vehicle tyres, are well known. They are usually composed of a matrix made of unsaturated rubber, generally diene rubber, which can be crosslinked with sulfur, comprising metal reinforcing elements (or "reinforcers") such as wires, films, tapes or cords made of carbon steel.

As they are subjected to very high stresses during the running of the tyres, especially to repeated actions of compression, bending or variation in curvature, these composites must, in a known way, satisfy a large number of sometimes contradictory technical criteria, such as uniformity, flexibility, flexural strength and compressive strength, tensile strength, wear resistance and corrosion resistance, and must maintain this performance at a very high level for as long as possible.

It is easily understood that the adhesive interphase between rubber and reinforcers plays a predominant role in the endurance of this performance. The conventional process for connecting the rubber compositions to carbon steel consists in coating the surface of the steel with brass (copper/zinc alloy), the bonding between the steel and the rubber matrix being provided by sulfurization of the brass during the vulcanization or curing of the rubber. In order to improve the adhesion, use is generally made, in addition, in these rubber compositions, of organic salts or metal complexes, such as cobalt salts, as adhesion-promoting additives.

In point of fact, it is known that the adhesion between the carbon steel and the rubber matrix is capable of weakening over time as a result of the gradual development of sulfides formed under the effect of the various stresses encountered, especially mechanical and/or thermal stresses, it being possible for the above decomposition process to be accelerated in the presence of moisture. Moreover, the use of cobalt salts renders the rubber compositions more sensitive to oxidation and to ageing, and significantly increases the cost thereof, not to mention that it is desirable to eliminate, in the long run, the use of such cobalt salts in rubber compositions due to the recent change in European regulations relating to metal salts of this type.

For all the reasons set out above, manufacturers of metal/rubber composites, in particular motor vehicle tyre manufacturers, are seeking novel adhesive solutions in order to adhesively bond metal reinforcers to rubber compositions, while overcoming, at least in part, the abovementioned disadvantages.

Thus, the recently published applications WO 2014/063963, WO 2014/063968, WO 2014/173838, WO 2014/173839, filed by the applicant companies, have described novel polymers with urea, urethane or thiourea units, and also the initial monomers thereof, which meet the above objectives. Used in particular as adhesion primer on metal in metal/rubber composites, these polymers make it possible very advantageously to adhesively bond the metal to the rubber matrices by subsequently using simple textile adhesives, such as "RFL" (resorcinol/formaldehyde latex) adhesives or other equivalent adhesive compositions, or else directly (that is to say, without employing such adhesives) to these rubber matrices when the latter contain, for example, appropriate functionalized unsaturated elastomers, such as epoxidized elastomers. Thus, the cobalt salts (or other metal salts) can in particular be dispensed with in the rubber compositions intended to be connected to brass-coated metal reinforcers.

In continuing their research, the applicant companies have found a novel polymer, of thermosetting type, which at ambient temperature has the same adhesive performance, with respect to metal and rubber, as the aforementioned polymers but which has, once thermoset (crosslinked), further improved thermal and chemical stability. Moreover, its specific microstructure makes it possible very advantageously to adjust the flexibility of the molecule depending on the particular applications targeted.

BRIEF DESCRIPTION OF THE INVENTION

The present invention relates to a polybenzoxazine comprising at least repeat units comprising at least one unit corresponding to the formulae (I) or (II):

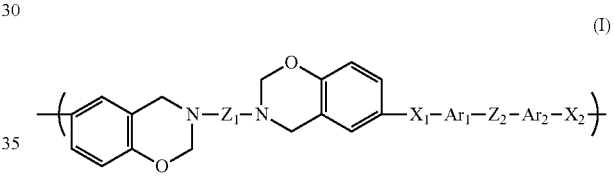

(I)

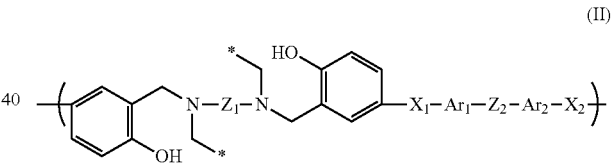

(II)

in which:
- $Z_1$ represents an at least divalent, aliphatic, cycloaliphatic or aromatic bonding group comprising at least one carbon atom and optionally at least one heteroatom selected from O, S, N and P;
- $X_1$ and $X_2$, which are identical or different, represent O or S;
- $Ar_1$ and $Ar_2$, which are identical or different, represent a substituted or unsubstituted phenylene group;
- $Z_2$ represents O or $(S)_n$, the symbol "n" representing an integer equal to 1 or greater than 1.

The invention also relates to the use of such a polymer as coating for a substrate, at least the surface of which is at least partially metallic, in particular for the adhesive bonding of such a substrate to a rubber.

The invention also relates to any substrate, at least the surface of which is at least partially metallic, at least said metallic part being coated with the polymer according to the invention.

BRIEF DESCRIPTION OF THE FIGURES

The invention and the advantages thereof will be easily understood in the light of the detailed description and exemplary embodiments which follow, and also of the figures relating to these examples, which represent or depict.

DETAILED DESCRIPTION OF THE INVENTION

It will firstly be recalled that benzoxazines are compounds of general formula:

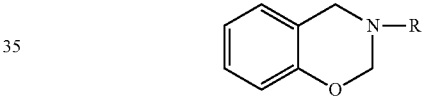

Figure 1A:
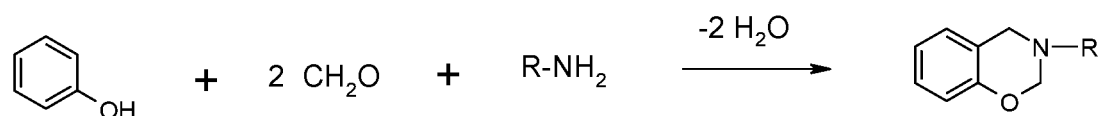
FIG. 1a the general principle for synthesis of a benzoxazine compound from three compounds, phenol, formaldehyde and amine (R=residue of the amine)

The appended FIG. 1a recalls the general principle for the synthesis of a benzoxazine, here starting from (condensation reaction) one molecule of phenol, two molecules of formaldehyde and an amine (R denoting the residue of the amine), with elimination of two molecules of water.

Figure 1B:
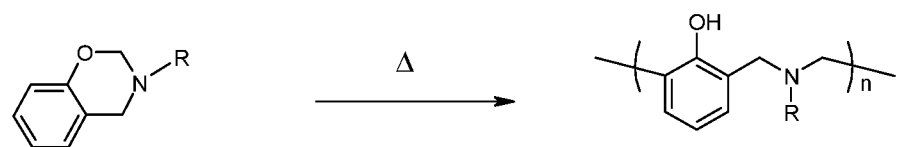
FIG. 1b the (ring-opening) mechanism for opening, by heat input, the oxazine ring of such a benzoxazine compound.

FIG. 1b itself recalls the (ring-opening) mechanism for opening the oxazine ring of such a compound during a heat input (represented by the symbol Δ).

Numerous benzoxazine compounds or monomers can thus be synthesized using various phenols and amines depending on their types of substituents. These groups of substituents may then provide polymerizable sites and enable the synthesis of various benzoxazine polymers (or polybenzoxazines).

Benzoxazines and polybenzoxazines which are derived therefrom are products that are nowadays well known to a person skilled in the art; to cite but a few publication examples, mention may be made of the articles "*Polybenzoxazines—New high performance thermosetting resins: synthesis and properties*"; N. N. Ghosh et al., Prog. Polym. Sci. 32 (2007), 1344-1391, or "*Recent Advancement on Polybenzoxazine—A newly Developed High Performance Thermoset*", Y. Yaggi et al., J. Polym. Sci. Part A: Polym. Chem.: Vol. 47 (2009), 5565-5576, and also for example the patents or patent applications U.S. Pat. No. 5,543,516, WO 2013/148408.

As explained in detail in the above documents, polybenzoxazines have the remarkable ability, at high temperature (for example typically above 150° C. or even above 200° C.

depending on their particular microstructure) to open their oxazine rings and to thus result in thermosetting polyphenolic resin structures.

The specific polybenzoxazine of the invention derives from a benzoxazine (referred to as Monomer M in the present application) of halogenated type that corresponds to the following generic formula (A), Hal representing a (at least one, i.e. one or more) halogen:

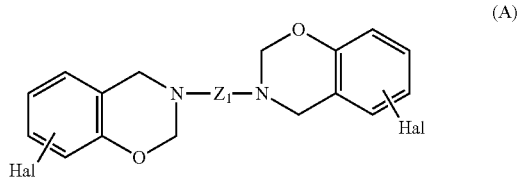

(A)

Figure 2:
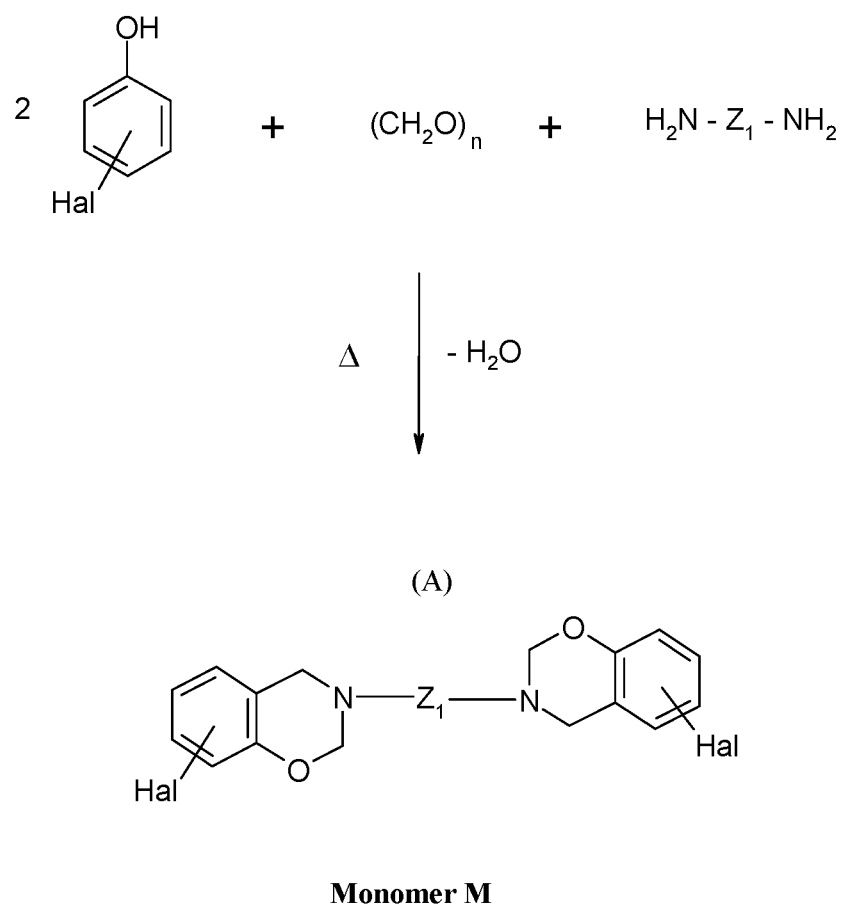
FIG. 2 a general scheme for the synthesis, starting from a halogenated phenol (the symbol Hal representing a halogen), paraformaldehyde and a diamine, of a halogenated benzoxazine of formula (A) (Monomer denoted by M) that can be used for the synthesis of a polybenzoxazine in accordance with the invention.

The appended FIG. 2 gives the general scheme for the synthesis thereof, under heat input and with elimination of water, starting from a halogenated phenol, p-formaldehyde and a diamine.

In the formula (A) above, $Z_1$ represents a bonding group (spacer) that is at least divalent, that is to say that it could comprise more than two covalent bonds, for example three or four covalent bonds. Preferably, $Z_1$ is divalent, that is to say comprises only two covalent bonds.

$Z_1$ may be aliphatic, cycloaliphatic or aromatic. This group, which may be ethylenically saturated or unsaturated, by definition comprises at least one (i.e. one or more) carbon atom, and optionally at least one (i.e. one or more) heteroatom chosen from O (oxygen), S (sulfur), N (nitrogen) and P (phosphorus).

According to one particular embodiment of the invention, $Z_1$ represents an aliphatic group comprising from 1 to 20, more preferentially from 1 to 16, in particular from 1 to 12 carbon atoms, or else a cycloaliphatic group comprising from 3 to 20, more preferentially from 3 to 16, in particular from 3 to 12 carbon atoms. More preferentially still, $Z_1$ represents a $C_1$-$C_{20}$, preferably $C_1$-$C_{16}$, in particular $C_1$-$C_{12}$ alkylene group.

Each benzene ring of the Monomer M bears at least one (i.e. one or more) halogen. Moreover, in this monomer of formula (A), one or more hydrogen atoms of at least one or each benzene ring may (optionally) be substituted by various substituents, for example by functional groups capable of promoting the adhesion of the polymer to the metal and/or to the rubber.

Preferably, each benzene ring of the monomer M bears a single halogen (Hal) or at most two, more preferentially one and only one halogen, the latter being more preferentially located in the para position to the oxygen of the oxazine ring.

According to one particularly preferential embodiment, Hal represents bromine.

Figure 3:
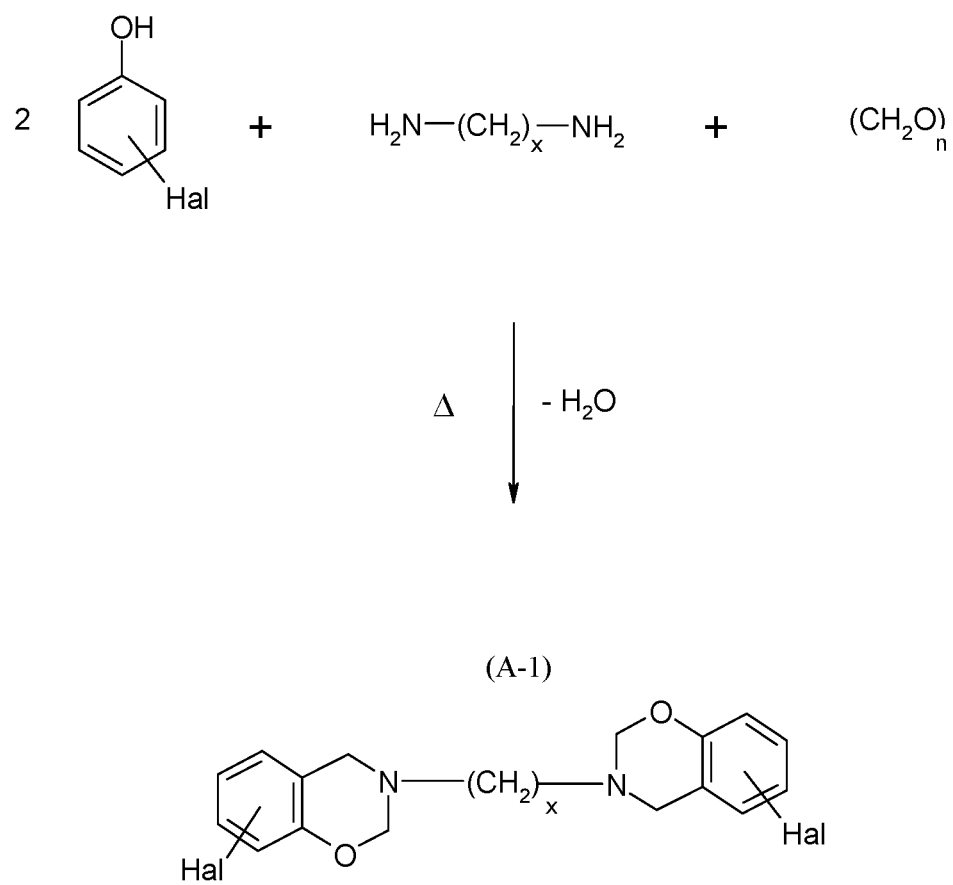
FIG. 3 a possible scheme for the synthesis, starting from a halogenated phenol, p-formaldehyde and a specific diamine, of aliphatic type, of a particular halogenated benzoxazine of formula (A-1) (Monomer denoted by M-1) that can be used for the synthesis of a to polybenzoxazine in accordance with the invention.
Figure 15:
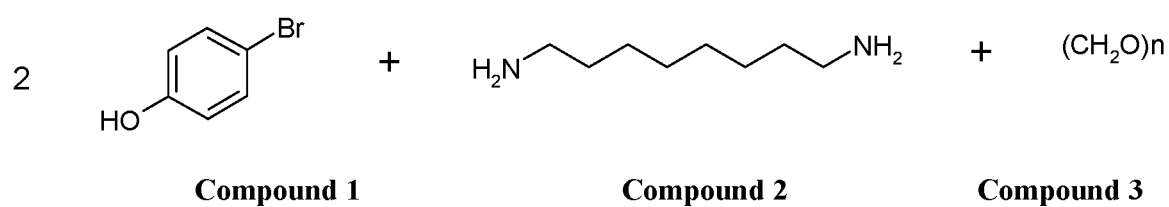
FIG. 15 the scheme for the synthesis, starting from brominated phenol (compound 1), p-formaldehyde (compound 3) and a specific aliphatic diamine (compound 2), of a particular brominated dibenzoxazine of formula (A-8) (Monomer denoted by M-8) that can be used for the synthesis of polybenzoxazines (Polymer P-4 and P-4' from FIG. 17) in accordance with the invention.
Figure 15:
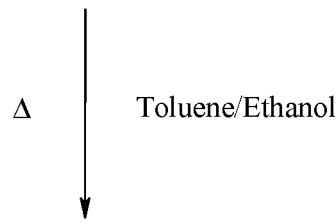
Figure 15:
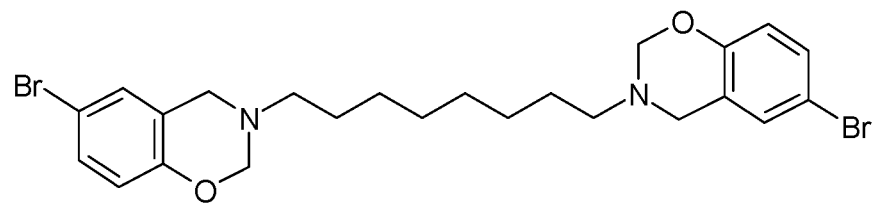

FIG. 3 illustrates a possible scheme for the synthesis, starting from a specific diamine of aliphatic type (polyethylene diamine), of a particular halogenated benzoxazine of formula (A-1), this benzoxazine being able to be used as monomer (Monomer denoted by M-1) for the subsequent synthesis of a polybenzoxazine in accordance with the invention. It is noted that $Z_1$ represents here a -$(CH_2)_x$- methylene group in which the symbol "x" represents an integer that preferably varies from 1 to 20, more preferentially from 1 to 16, in particular from 1 to 12. Such a synthesis will be described in more detail in the exemplary embodiments which follow (FIG. 15).

Figure 4:
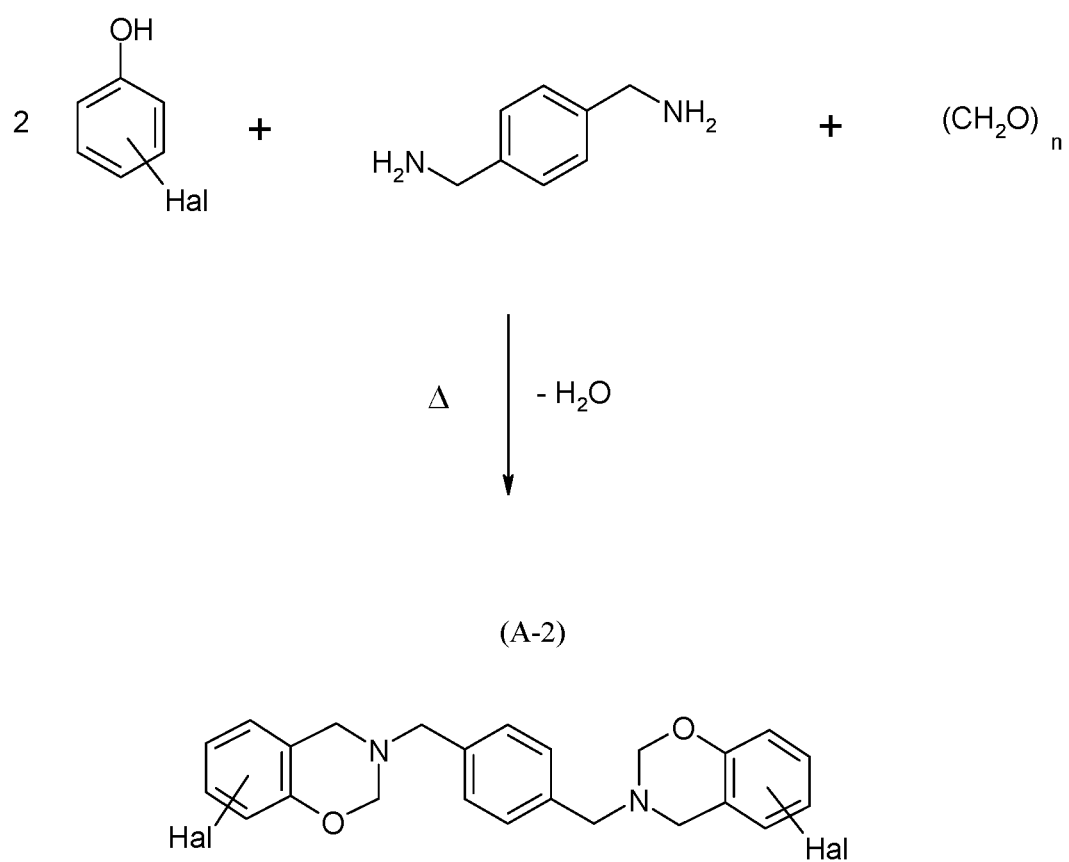
FIG. 4 another possible scheme for the synthesis, starting from a halogenated phenol, p-formaldehyde and another specific diamine, of aromatic type, of another example of a particular halogenated benzoxazine of formula (A-2) (Monomer denoted by M-2) that can be used for the synthesis of another polybenzoxazine in accordance with the invention.

According to another preferred embodiment, $Z_1$ represents an aromatic group comprising from 6 to 30, more preferably from 6 to 20, carbon atoms. Thus, FIG. 4 illustrates another possible scheme for the synthesis, this time starting from a specific diamine of aromatic type (p-xylylene diamine), of another example of a particular halogenated benzoxazine of formula (A-2), that can be used as monomer (Monomer denoted by M-2) for the subsequent synthesis of another polybenzoxazine in accordance with the invention.

Figure 5:
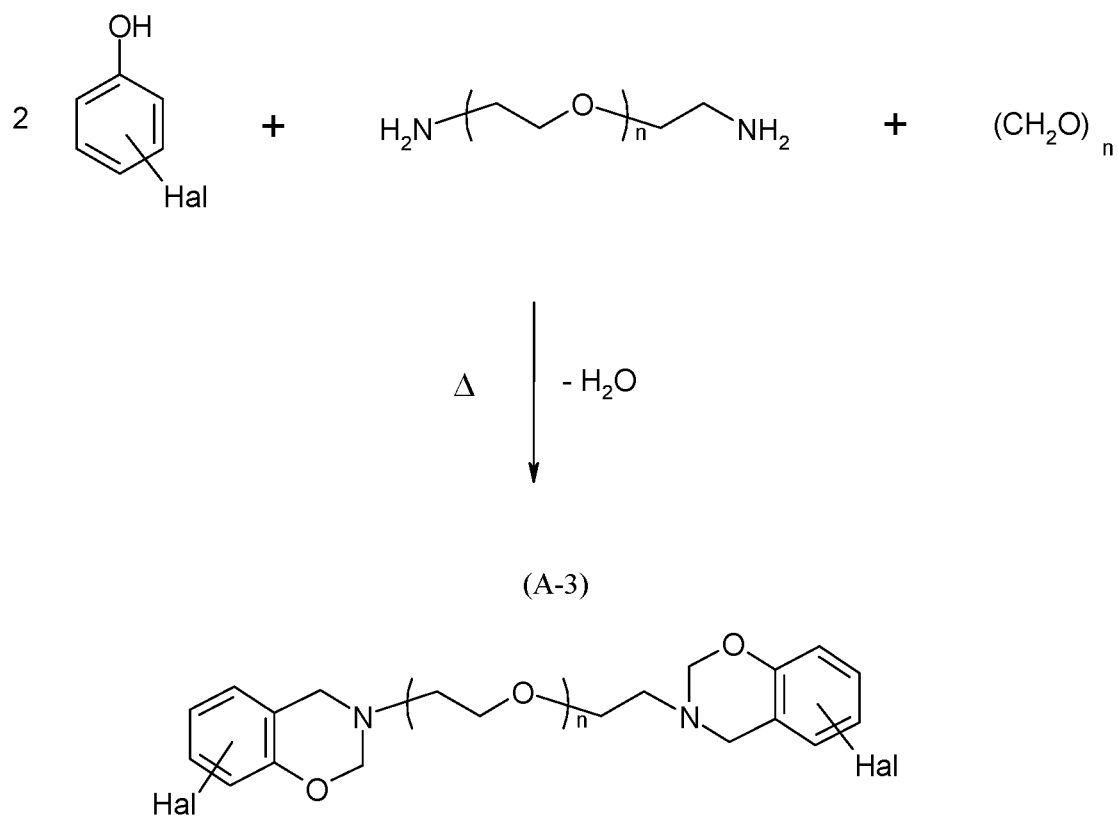
FIGS. 5, 6 and 7 three other possible schemes for the synthesis, starting from a halogenated phenol, p-formaldehyde and specific diamines that are all aliphatic, of other examples of particular halogenated benzoxazines of respective formulae (A-3), (A-4) and (A-5) (Monomers denoted by M-3, M-4 and M-5) that can be used for the synthesis of other polybenzoxazines in accordance with the invention.
Figure 6:
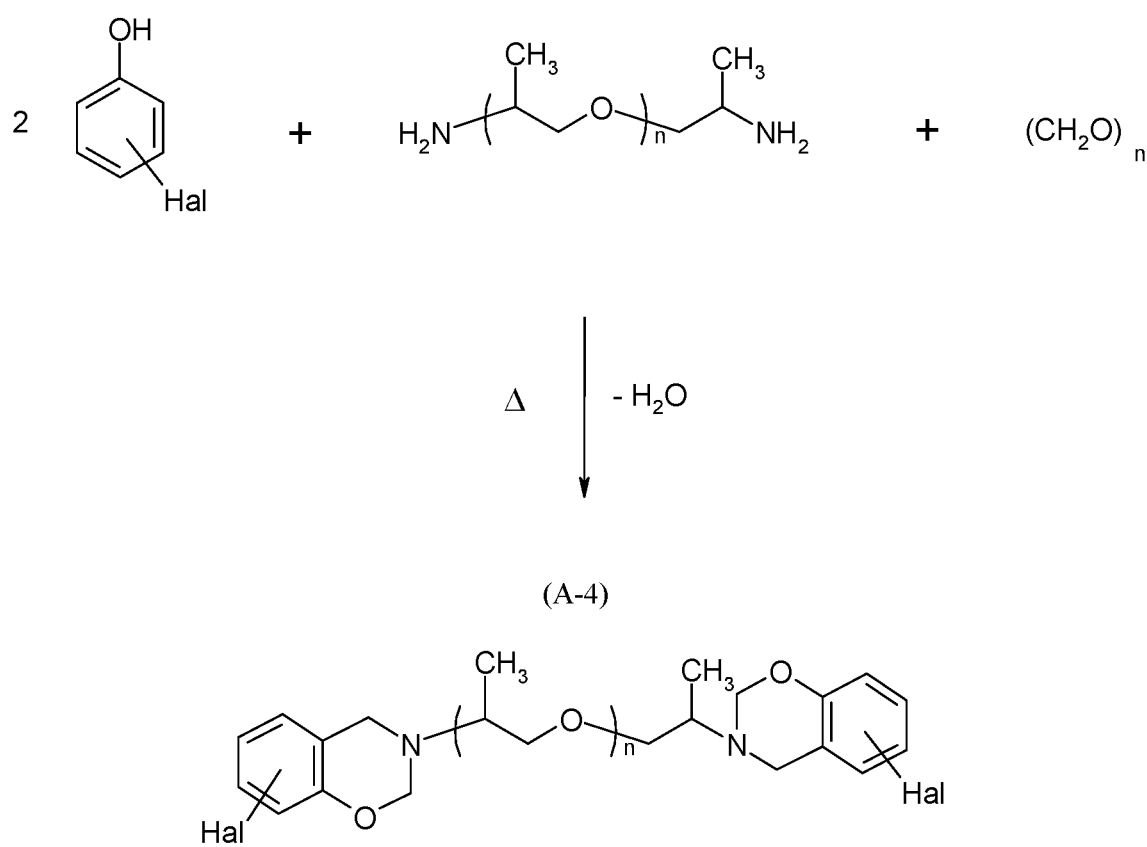
Figure 7:
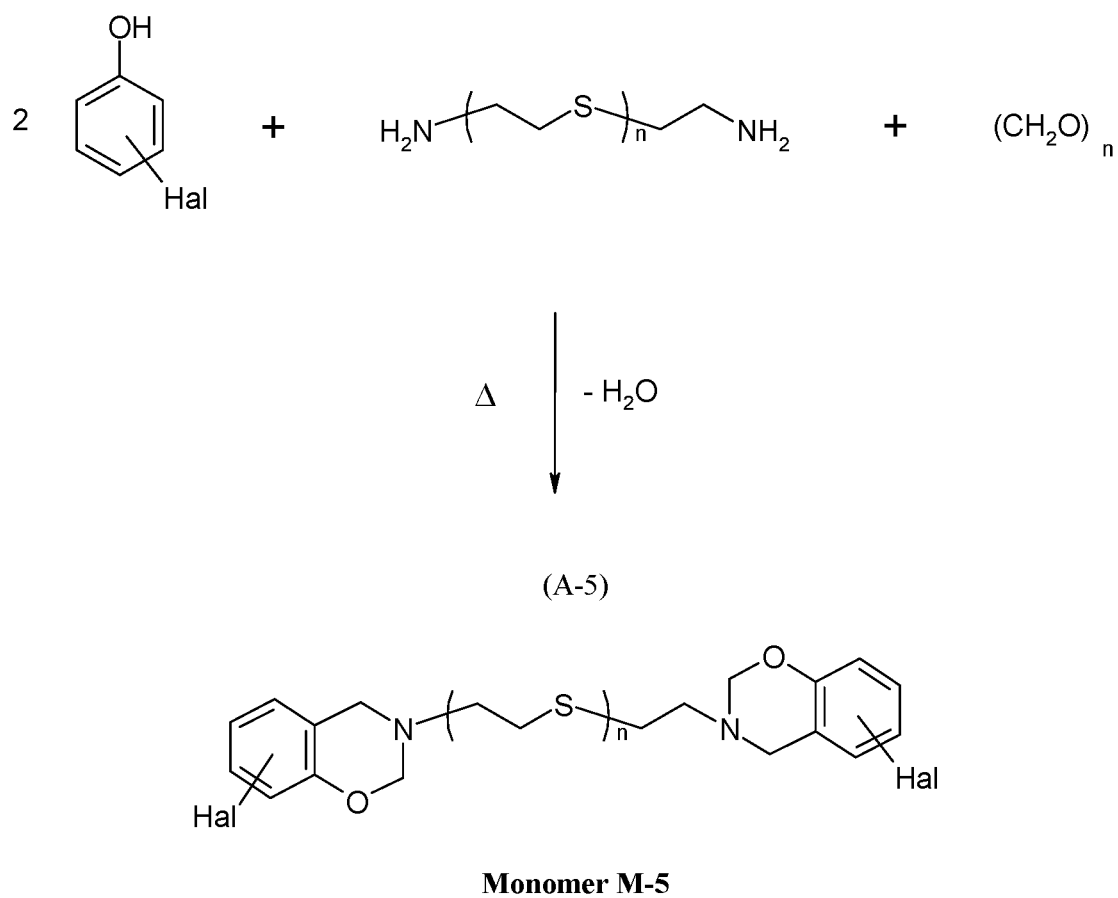

FIGS. 5, 6 and 7 illustrate three other possible schemes for the synthesis, always starting from a halogenated phenol and paraformaldehyde on the one hand and, on the other hand, from various specific diamines, all of aliphatic type, of other examples of particular benzoxazines of respective formulae (A-3), (A-4) and (A-5) that can be used as monomers (Monomers respectively denoted by M-3, M-4 and M-5) for the synthesis of polybenzoxazines in accordance with the invention.

In FIG. 5, the repetition of the (polyethylene oxide) [—$CH_2$—$CH_2$—O—] units on the bonding group $Z_1$ is capable of resulting in polybenzoxazines of high crystallinity, whilst in FIG. 6, the presence of the (polypropylene oxide) methyl groups on $Z_1$ makes it possible to reduce the reactivity of the two amine end groups and to result in polybenzoxazines of lower crystallinity. In FIG. 7, the presence on the spacer $Z_1$ of the sulfur atom (heteroatom) in the (polyethylene thioether) [—$CH_2$—$CH_2$—S—] repeat units, is capable of further improving the adhesion of the polybenzoxazine to metal. Thus, it can be seen that the structure of the $Z_1$ group of the benzoxazine monomer may be modified considerably with the aim of adjusting the properties of the final polymer. This constitutes a major advantage of the present invention.

Figure 8:
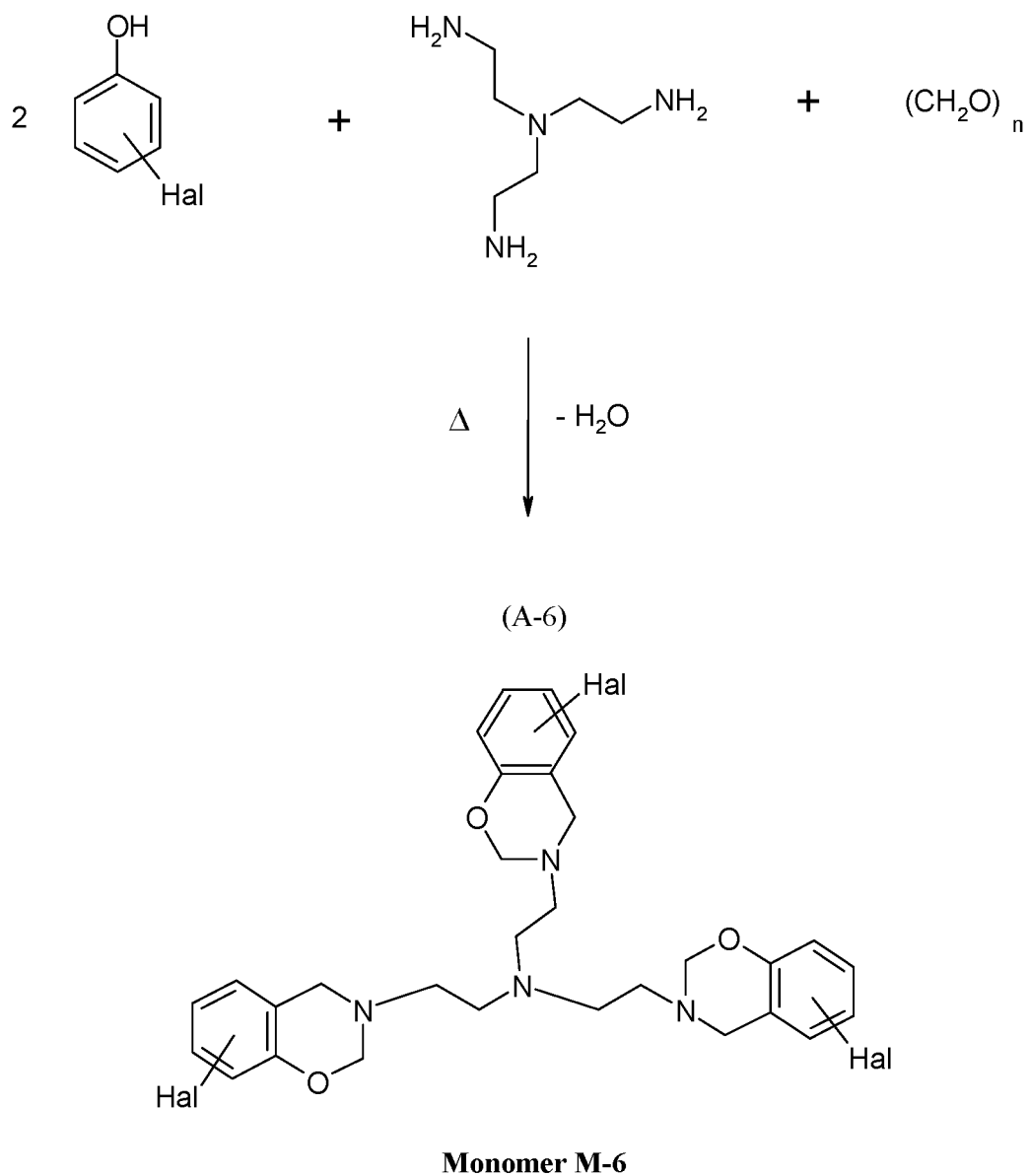
FIG. 8 another possible scheme for the synthesis, starting from a halogenated phenol, p-formaldehyde and a specific aliphatic triamine, of another example of a particular halogenated benzoxazine of formula (A-6) (Monomer denoted by M-6) that can be used for the synthesis of another polybenzoxazine in accordance with the invention.

FIG. 8 illustrates another possible scheme for the synthesis, starting from a halogenated phenol, paraformaldehyde and a specific aliphatic polyamine consisting this time of a triamine, tris(3-aminopropyl)amine, of another example of a particular halogenated (tri)benzoxazine compound of formula (A-6) that can be used as a monomer (Monomer denoted by M-6) for the synthesis of another polybenzoxazine in accordance with the invention.

The polybenzoxazine of the invention (Polymer P) therefore has the essential feature of comprising structural repeating units comprising at least one unit corresponding to the formula (I) (before opening of the oxazine rings) or formula (II) (after ring opening) below:

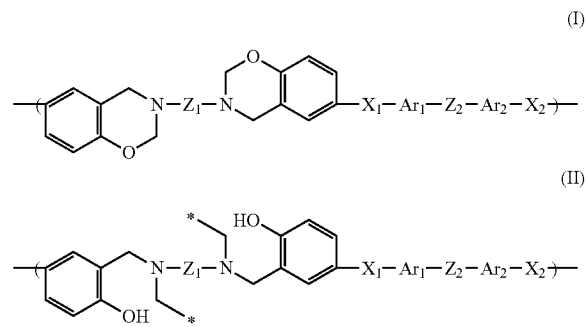

in which:

$Z_1$ has the main definition and preferential definitions already given above for the benzoxazine (monomer) compound;

$X_1$ and $X_2$, which are identical or different, represent O (oxygen) or S (sulfur);

$Ar_1$ and $Ar_2$, which are identical or different, represent a substituted or unsubstituted phenylene group;

$Z_2$ represents O or $(S)_n$, the symbol "n" representing an integer equal to 1 (case of a single sulfur atom) or greater than 1 (case of several sulfur atoms).

A polymer should be understood here as any homopolymer or copolymer, in particular block copolymer, with repeating structural units comprising at least one unit of formula (I) or (II) above; the polymer of the invention may of course comprise those units of formula (I) and units of formula (II).

In formula (II) above, a person skilled in the art will immediately understand that the two symbols "*" (which are identical or different) represent any attachment of the unit to a carbon atom or to a heteroatom (preferably chosen from O, S, N and P), which attachment or bond results from the opening of the oxazine rings.

Figure 9:
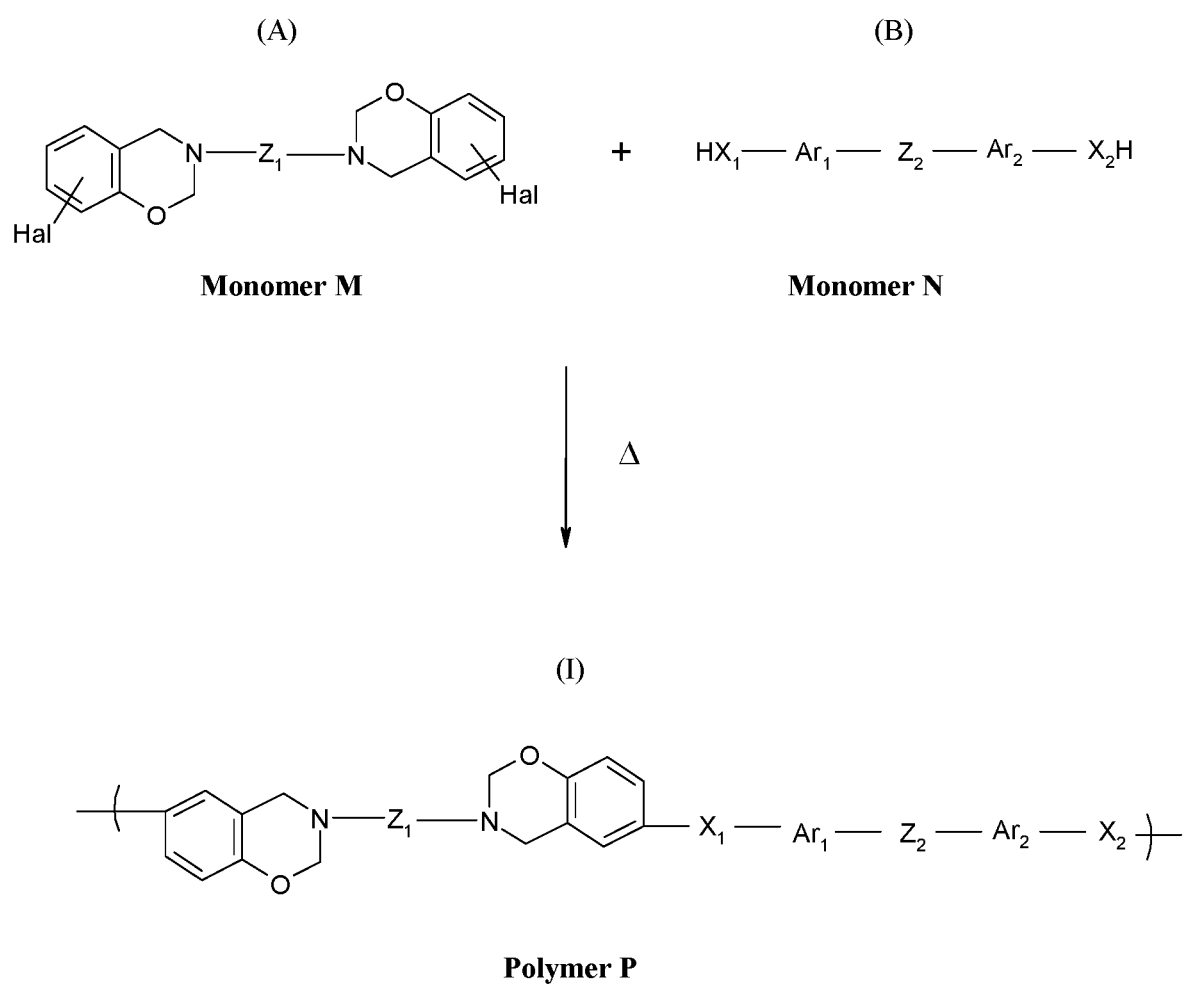
FIG. 9 a general scheme for the synthesis of a polybenzoxazine polymer (Polymer denoted by P) according to the invention, starting from the halogenated benzoxazine of formula (A) (Monomer M) from FIG. 2 and another monomer of generic formula (B) (Monomer denoted by N) of aromatic diol or thiol type.

FIG. 9 represents a general scheme for the synthesis, by polycondensation, of such a polybenzoxazine (Polymer P) according to the invention, starting from the halogenated benzoxazine of formula (A) from FIG. 2 (Monomer M) and from another monomer, of generic formula denoted by (B), which has the feature of being of aromatic diol or thiol type (generic Monomer denoted by N).

In the general formulae (I) and (II) above, preferentially at least one of the following features is satisfied:

$Ar_1$ and $Ar_2$ each represent an unsubstituted benzene ring;
$X_1$ and $X_2$ each represent either a sulfur atom, or an oxygen atom;
$Z_2$ represents O or S (i.e. "n" equal to 1), more preferentially S;
$Z_1$ represents $(CH_2)_x$ in which "x" preferably varies from 1 to 20, more preferentially from 1 to 16, in particular from 1 to 12.

More preferentially, all of the preferential features above are satisfied simultaneously.

Moreover, in the formulae (I) and (II) above, one or more hydrogen atoms of at least one or each benzene ring $Ar_1$ and $Ar_2$ could (optionally) be substituted by one or more substituents, which are identical or different, for example by functional groups capable of promoting the adhesion of the polymer to the metal and/or to the rubber.

Figure 13:
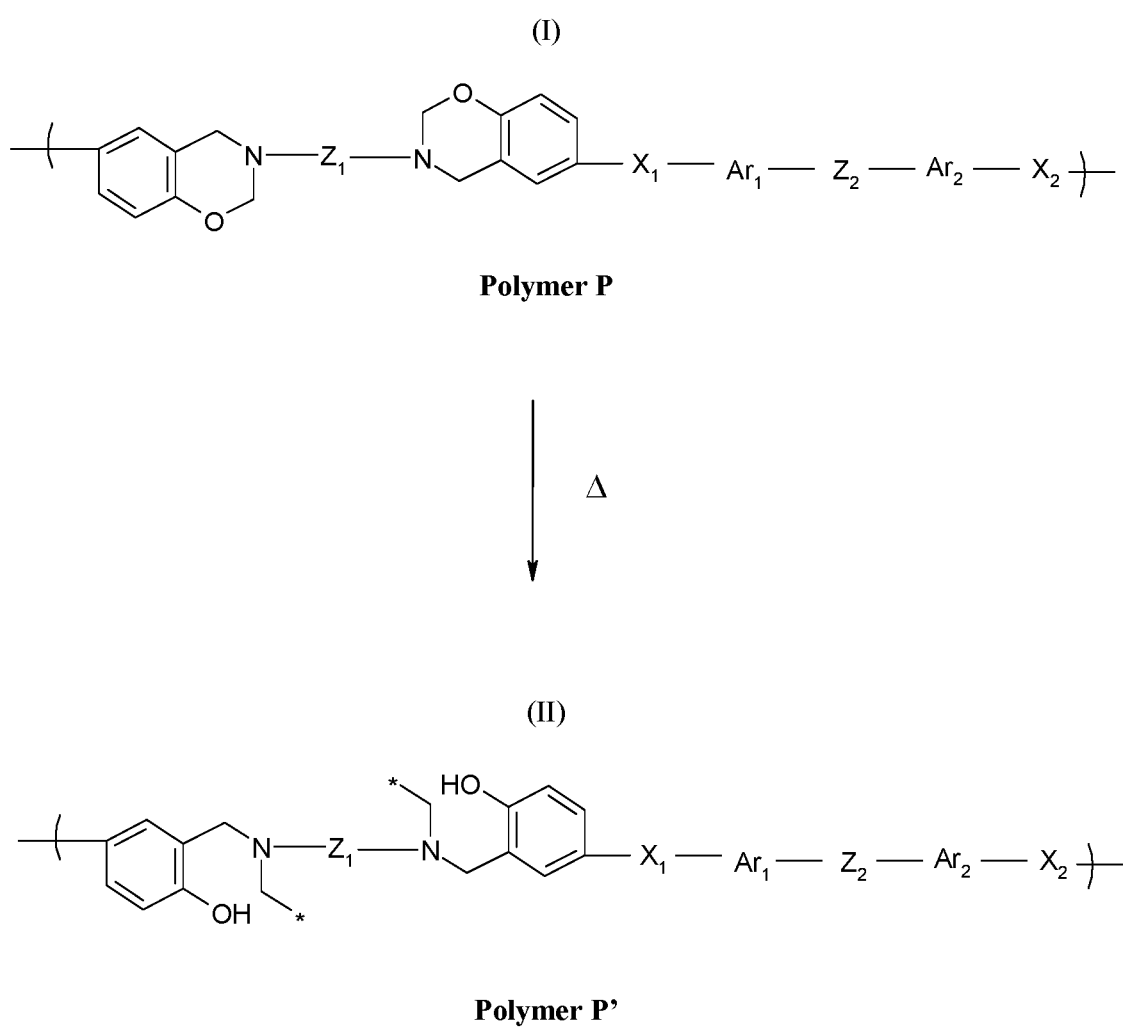
FIG. 13 the polybenzoxazine (Polymer denoted here by P') according to the invention from FIG. 9 once the oxazine rings thereof have been opened after heat treatment of the Polymer P.

The polybenzoxazine "P" from FIG. 9, more precisely at least some of its repeat units, has also been represented in FIG. 13, before (FIG. 13a, Polymer P) and after (FIG. 13b, Polymer P') the opening of its oxazine rings.

Figure 10:
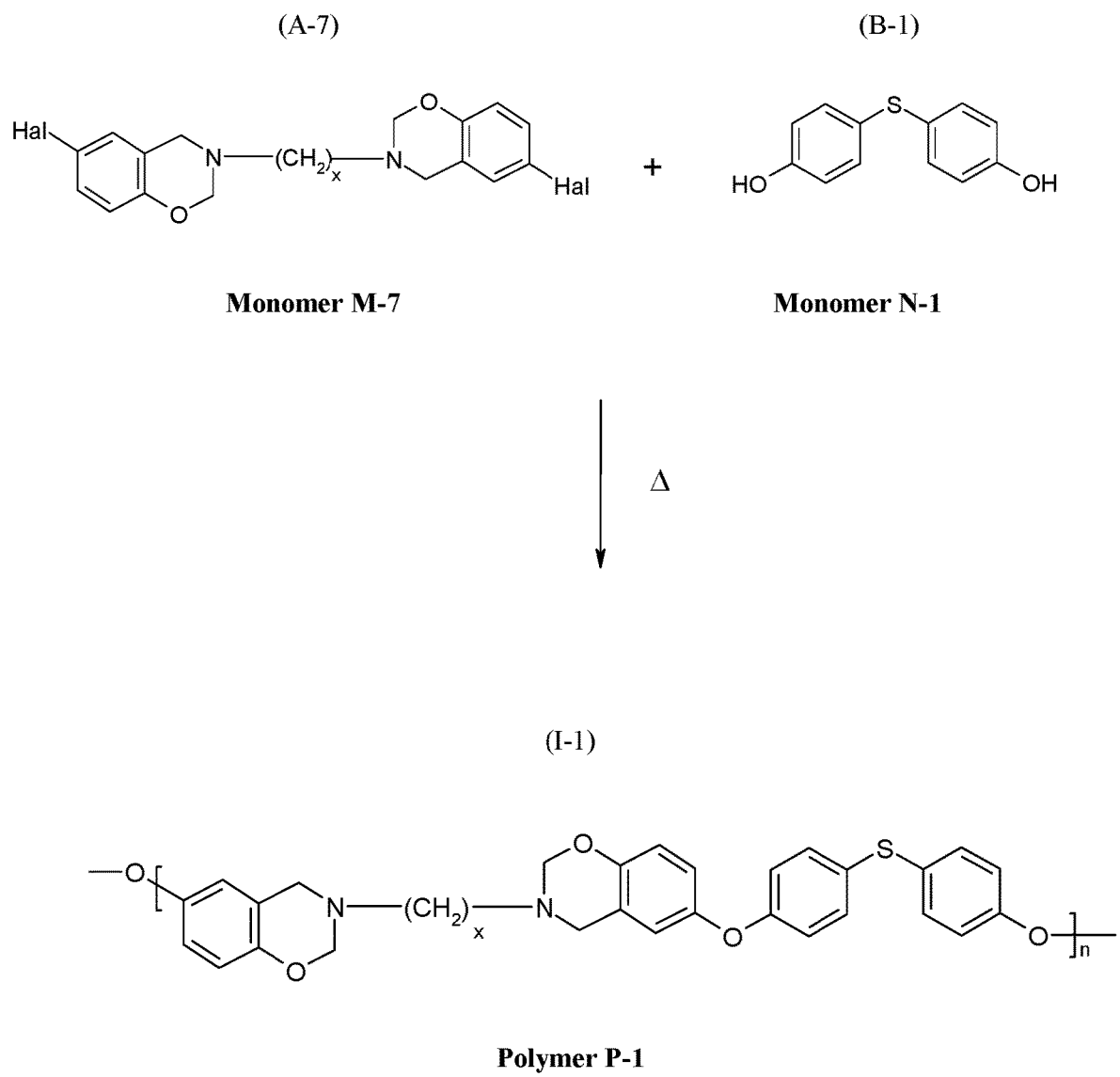
FIG. 10 a scheme for the synthesis of a particular polybenzoxazine polymer (Polymer denoted by P-1) according to the invention, starting from a particular halogenated benzoxazine of formula (A-7) (Monomer M-7) and another particular monomer of formula (B-1) (Monomer N-1) of sulfur-containing aromatic diol type (bearing a thioether function)

FIG. 10 represents a particular scheme for the synthesis of a specific polybenzoxazine according to the invention (Polymer denoted by P-1) of formula (I-1), starting from a particular halogenated benzoxazine (Monomer M-7) of formula (A-7) and from another specific monomer (Monomer N-1) of formula (B-1) of sulfur-containing aromatic diol type (4,4'-thiodiphenol).

In this example, it is noted in particular, according to one preferred embodiment of the invention already described, that each benzene ring of the monomer M-7 bears one and only one halogen (Hal), more preferentially bromine, this halogen being more particularly located in the para position to the oxygen of the oxazine ring.

Figure 14:
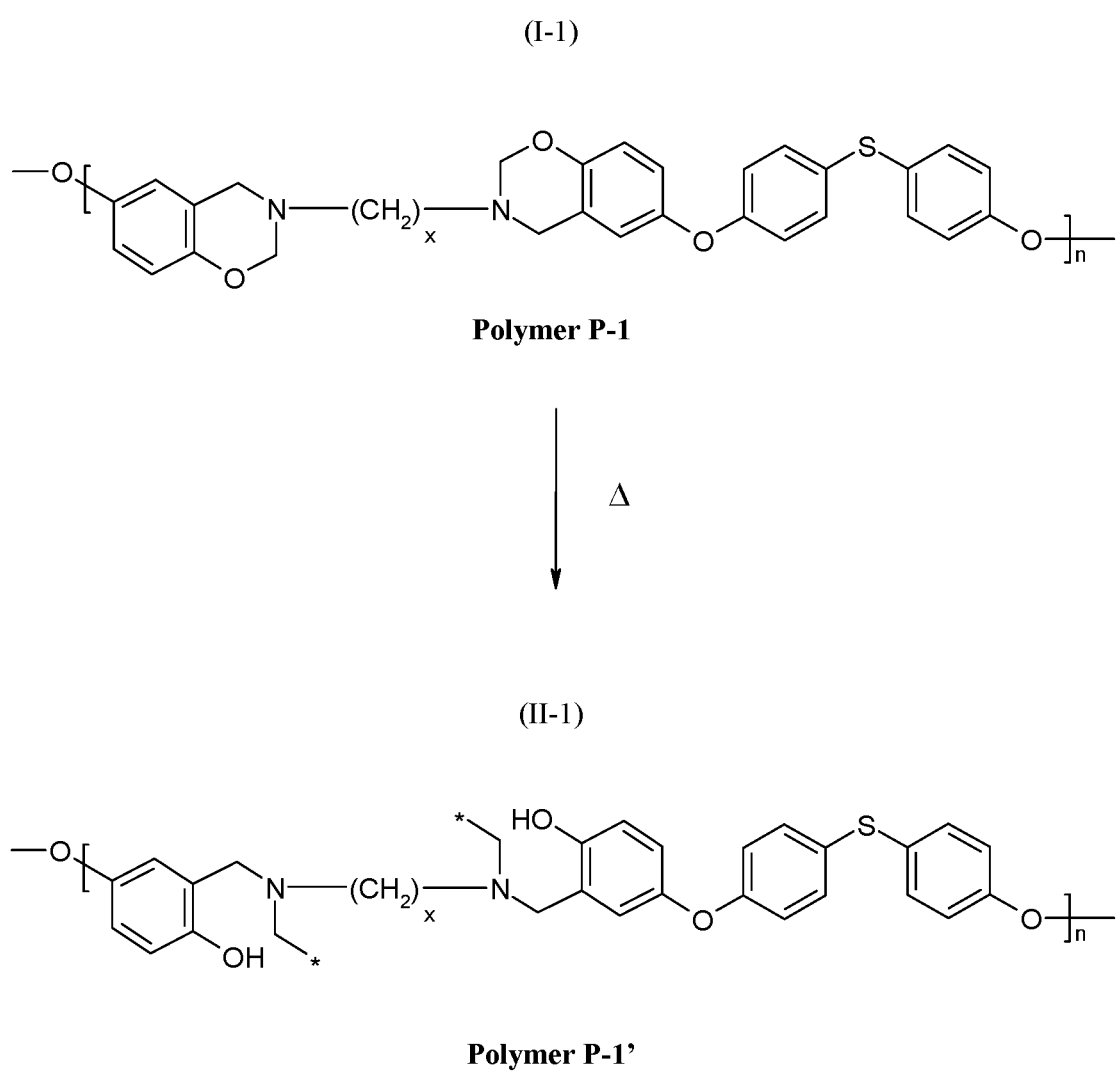
FIG. 14 the particular polybenzoxazine (Polymer denoted by P-1') according to the invention of FIG. 10, once the oxazine rings thereof have been opened after heat treatment of the to Polymer P-1.

This polybenzoxazine from FIG. 10, or more precisely at least some of its repeat units, has also been represented in FIG. 14, before (FIG. 14a, Polymer P-1) and after (FIG. 14b, Polymer P-1') the opening of its oxazine rings following a sufficient heat input.

Thus, according to one particularly preferred embodiment, the polybenzoxazine of the invention is characterized by repeat units comprising at least one unit corresponding to the particular formulae (I-1) (before opening of the oxazine rings) or (II-1) (after ring opening):

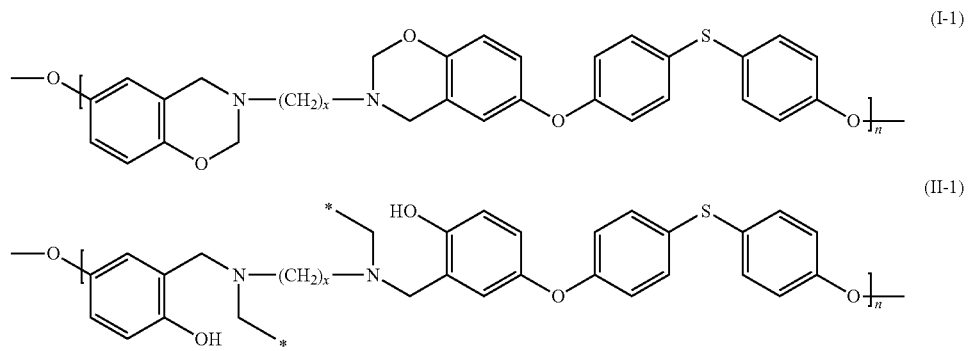

Figure 11:
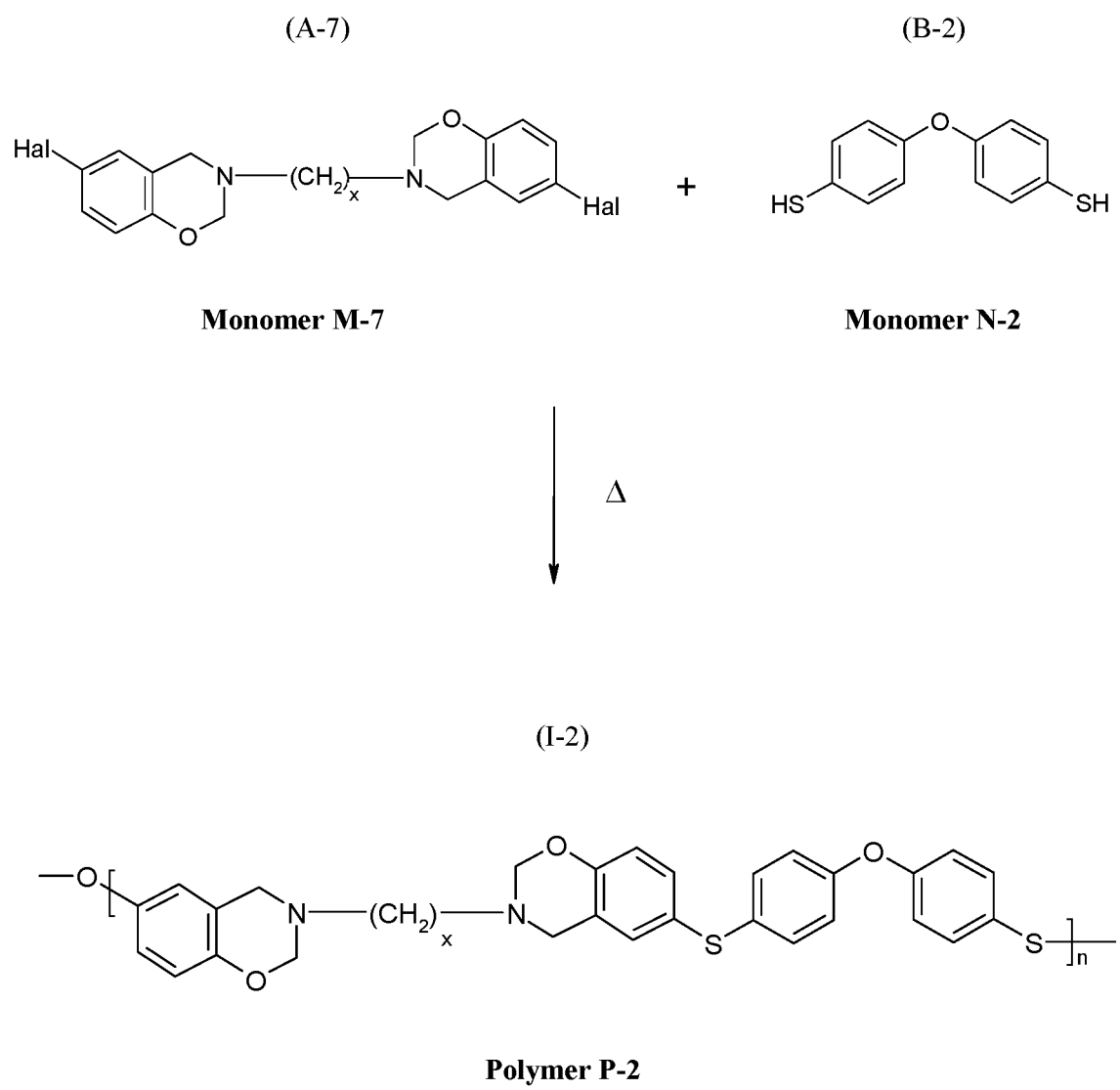
FIG. 11 a scheme for the synthesis of another polybenzoxazine (Polymer denoted by P-2) according to the invention, starting from the particular halogenated benzoxazine of formula (A-7) (Monomer M-7) from the preceding FIG. 10 and another particular monomer of formula (B-2) (Monomer N-2) of aromatic thiol type (bearing an ether function)

FIG. 11 represents another particular scheme for the synthesis of another specific polybenzoxazine (Polymer denoted by P-2) according to the invention, of formula (I-2), starting from the preceding specific halogenated benzoxazine (Monomer M-7) and from another specific monomer (Monomer N-2) of formula (B-2), of aromatic thiol type (further bearing an ether function).

Figure 12:
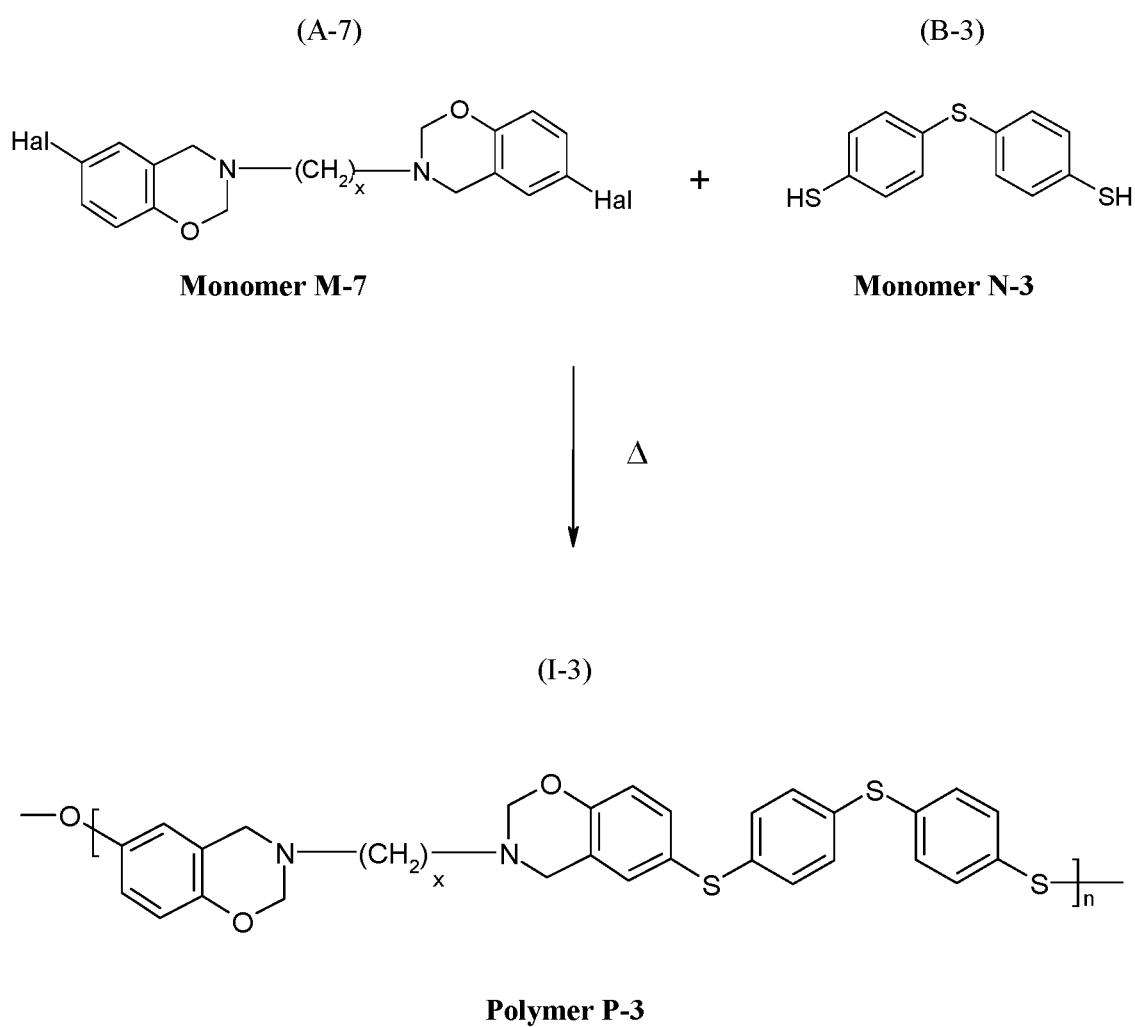
FIG. 12 a scheme for the synthesis of another polybenzoxazine (Polymer denoted by P-3) according to the invention, starting from the halogenated benzoxazine of formula (A-7) (Monomer M-7) and another particular monomer of formula (B-3) (Monomer N-3) of aromatic thiol type (bearing a thioether function)

FIG. 12 represents another particular scheme for the synthesis of another specific polybenzoxazine (Polymer denoted by P-3) according to the invention, of formula (I-3), starting from the preceding specific halogenated benzoxazine (Monomer M-7) and from another specific monomer (Monomer B2) of aromatic thiol type (further bearing a thioether function).

In these examples from FIGS. 11 and 12, as for the preceding FIG. 10, it is noted in particular, according to one preferred embodiment of the invention already indicated, that each benzene ring of the Monomer M-7 bears one and only one halogen (Hal), more preferentially bromine, located more particularly in the para position to the oxygen of the oxazine ring.

As already indicated, FIGS. 13 and 14 also represent polybenzoxazines according to the invention (here are respectively denoted by P' and P-1') from FIG. 9 and FIG. 10, once their oxazine rings are open.

Typically, the polybenzoxazine of the invention may comprise from ten to several hundred, preferably from 50 to 300 structural units having units of formula (I) and/or (II), in particular structural units as represented as examples in FIGS. 10 to 14 and 17.

The polybenzoxazine of the invention can advantageously be used, as adhesion primer or as sole adhesive layer, for coating a metal substrate, at the very least a substrate where at least the surface is at least partially metallic, and in particular adhering this substrate to rubber.

The invention also relates to such a substrate, in particular made of steel such as a carbon steel. The steel could be bright (i.e. uncoated) steel, or else may be coated at least partially with at least one layer (therefore intermediate layer, positioned between steel and polybenzoxazine layer) of a second metal, referred to as surface metal, selected from the group consisting of aluminium, copper, zinc and alloys of at least one of these metals with at least one other metal (which may or may not belong to this group). This surface metal is in particular brass.

In order to adhere the rubber to the polybenzoxazine layer, use could be made of any known adhesive system, for example a conventional textile adhesive of "RFL" type comprising at least one diene elastomer such as natural rubber, or any equivalent adhesive known for imparting satisfactory adhesion between rubber and conventional polymers such as polyester or polyamide, such as for example the adhesive compositions described in the patent applications WO 2013/017421, WO 2013/017422, WO 2013/017423, WO 2015/007641, WO 2015/007642.

Before the above adhesive coating process, it might be advantageous to activate the surface of the polymer of the invention, for example physically and/or chemically, to improve the adhesive uptake thereof and/or the final adhesion thereof to the rubber. A physical treatment could consist, for example, of a treatment by radiation such as an electron beam, or by plasma; a chemical treatment could consist, for example, of prior passage through a bath of epoxy resin and/or isocyanate compound.

A person skilled in the art will readily understand that the connection between the metal substrate provided with its polybenzoxazine layer and the rubber layer with which it is in contact will be definitively provided during the final curing (crosslinking) of the rubber article in question.

Exemplary Embodiments of the Invention

In the present application, unless expressly indicated otherwise, all the percentages (%) shown are % by weight.

The following tests firstly describe the synthesis of a benzoxazine compound (Monomer M-8), then that of a preferential polybenzoxazine (Polymer P-4) according to the invention. Lastly, adhesion tests are carried out in order to illustrate the excellent adhesive performance of the polybenzoxazines of the invention.

Synthesis of a Halogenated Benzoxazine Compound (Monomer M-8)

For this synthesis, a 250-ml three-neck round-bottomed flask, equipped with a thermometer, a nitrogen inlet, a magnetic stirrer and a condenser is provided.

The synthesis is carried out according to the operating procedure depicted in FIG. 15, as explained in detail below, starting from three compounds: a halogenated phenol (compound 1; 4-bromophenol; Aldrich product B75808), an aliphatic diamine (compound 2; 1,8-diaminooctane; Aldrich product D22401) and a p-formaldehyde (compound 3; Aldrich product 158127), in the presence of two solvents (anhydrous toluene and anhydrous ethanol).

Compound 1 (2 eq, 10.38 g, i.e. 60 mmol) then ethanol (51 ml) are poured into the round-bottomed flask. The presence of ethanol is important here, preventing the formation of an unstable triazine-type intermediate product. While stirring, compound 2 (1 eq, 4.32 g, i.e. 30 mmol), compound 3 (4 eq, 3.60 g, i.e. 120 mmol) and finally the toluene (102 ml) are then introduced. The reaction medium is heated (around 75° C.) at reflux for 72 h, then placed on a rotary evaporator, at 50° C. under 50 mbar, to evaporate the solvents. A lemon-yellow coloured oil is thus obtained.

This oil then undergoes a first purification on an $SiO_2$ column, with the aid of a diethyl ether/cyclohexane eluent, in a volume ratio of the two solvents that varies from 10:35 (initial) to 10:20 (final). The purified fractions containing the monomer (M-8) are recombined and the solvents are evaporated. A light yellow solid is thus obtained. The latter is placed in methanol (1 g per 80 ml) and heated at reflux (65° C.) for 30 min. The solution is then left to cool to ambient temperature (around 20° C.) for crystallization of the monomer. The solid product obtained is isolated by filtration (Büchner filter). White-coloured crystals are thus obtained, which are dried in a vacuum oven at 50° C., overnight, to eliminate any trace of solvent (reaction yield of around 60%).

Figure 16:
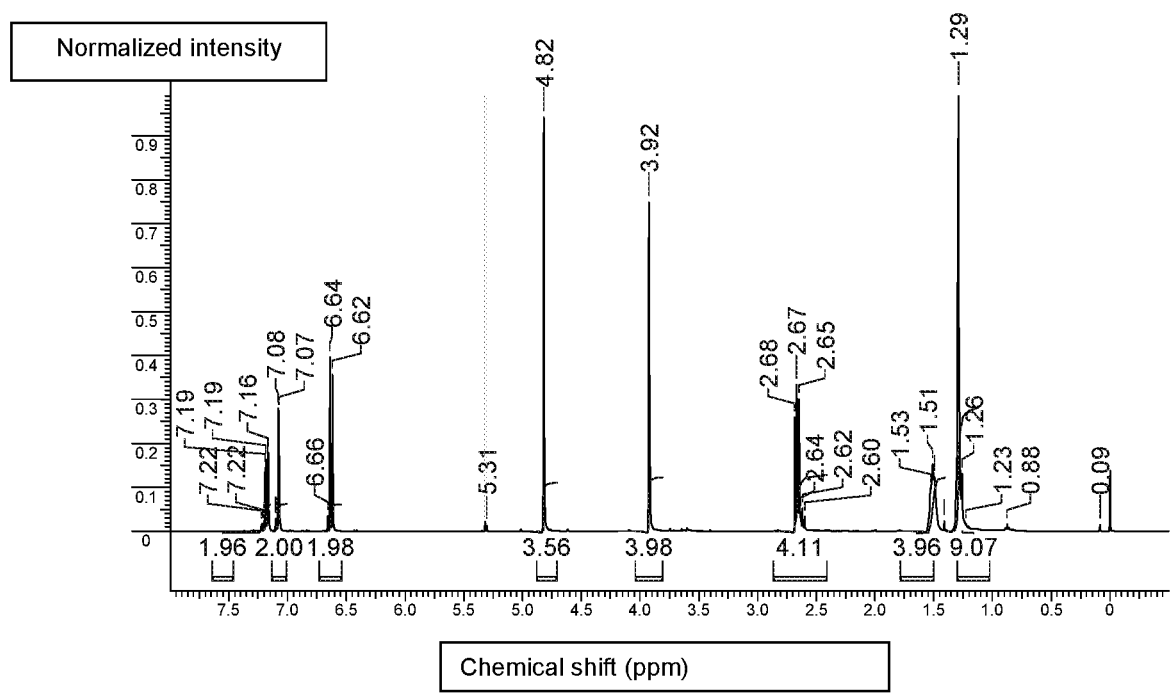
FIG. 16 the $^1$H NMR spectrum (500 MHz) of Monomer M-8 dissolved in $CD_2Cl_2$.

The $^1$H NMR spectrum (500 MHz) of the Monomer M-8 thus synthesized, dissolved in $CD_2Cl_2$, is reproduced in the appended FIG. 16. This NMR analysis gives the following results:

$^1$H MMR (500 MHz) $CD_2Cl_2$.1.29 (m, 8H), 1.51 (m, 4H), 2.67 (m, 4H), 3.92 (s, 4H), 4.82 (s, 4 H), 6-62-6-64- (d, 2H), 7.08 (s, 2H), 7.17-7.19 (d, 2H).

Synthesis of a Polybenzoxazine (Polymer P-4)

This synthesis is carried out according to the operating procedure depicted in FIG. 17, as described in detail below, starting from two monomers: the benzoxazine obtained in the preceding step (Monomer M-8) and the sulfur-containing aromatic diol of formula (B-1) (4,4'-thiodiphenol; Monomer N-1) already described in FIG. 10; this being in the presence of sodium carbonate ($Na_2CO_3$; Sigma Aldrich product 13418), the (anhydrous) solvents DMA (N,N-dimethylacetamide; Sigma Aldrich product 38839) and toluene (Acros Organics product No. 364411000). The two monomers (M-8 and N-1) are dried beforehand under vacuum at 50° C. overnight, and likewise for the sodium carbonate but at a temperature of 150° C.

The synthesis is carried out in a 100-ml four-neck round-bottomed flask, equipped with a nitrogen inlet, a thermometer, a magnetic stirrer and a Dean-Stark separator surmounted by a condenser and by a distillation bridge (provided with a heating mantle). The apparatus is dried under vacuum using a hot air gun until the thermometer reaches a temperature of at least 100° C. in the reaction flask. Everything is left to cool to ambient temperature (20° C.), then the apparatus is placed under a stream of nitrogen throughout the synthesis.

Firstly the Monomer M-8 (1 eq, 1.5 g, i.e. 2.79 mmol) of formula (A-8), and next the Monomer N-1 of formula (B-1) (1 eq, 0.61 g, i.e. 2.79 mmol) are then introduced into the round-bottomed flask. Added next are 20 ml of DMA (solvent of both monomers), then, as base, $Na_2CO_3$ (3 eq, 0.89 g, i.e. 8.36 mol) in suspension in 4 ml of toluene. Everything is purged under $N_2$ for 5 min, then the reaction medium is heated to 105° C. Once this temperature is reached (heating mantle temperature of around 115° C.), the distillation bridge of the Dean-Stark apparatus is heated to 110° C. (with the heating mantle) in order to facilitate the azeotropic distillation (water/toluene distillation) carried out for around 90 min. Next, the temperature of the reaction medium is gradually increased, in steps of 10° C. every 30 min, until it reaches 130° C. It is left at this temperature overnight (12 h), then it is left to cool to ambient temperature (20° C.). The reaction mixture is finally poured into 250 ml of distilled water, with vigorous (magnetic bar) stirring; it is left stirring for 30 min (20° C.), then the precipitate thus obtained is isolated by filtration (Buchner filter) and washed with 100 ml of distilled water; during this washing, in order to extract the carbonate, acid (10% aq. HCl) is added dropwise until a neutral pH is reached. The precipitate is once again washed with 100 ml of distilled water, dried under vacuum at 80° C. overnight (around 12 h).

Figure 17:
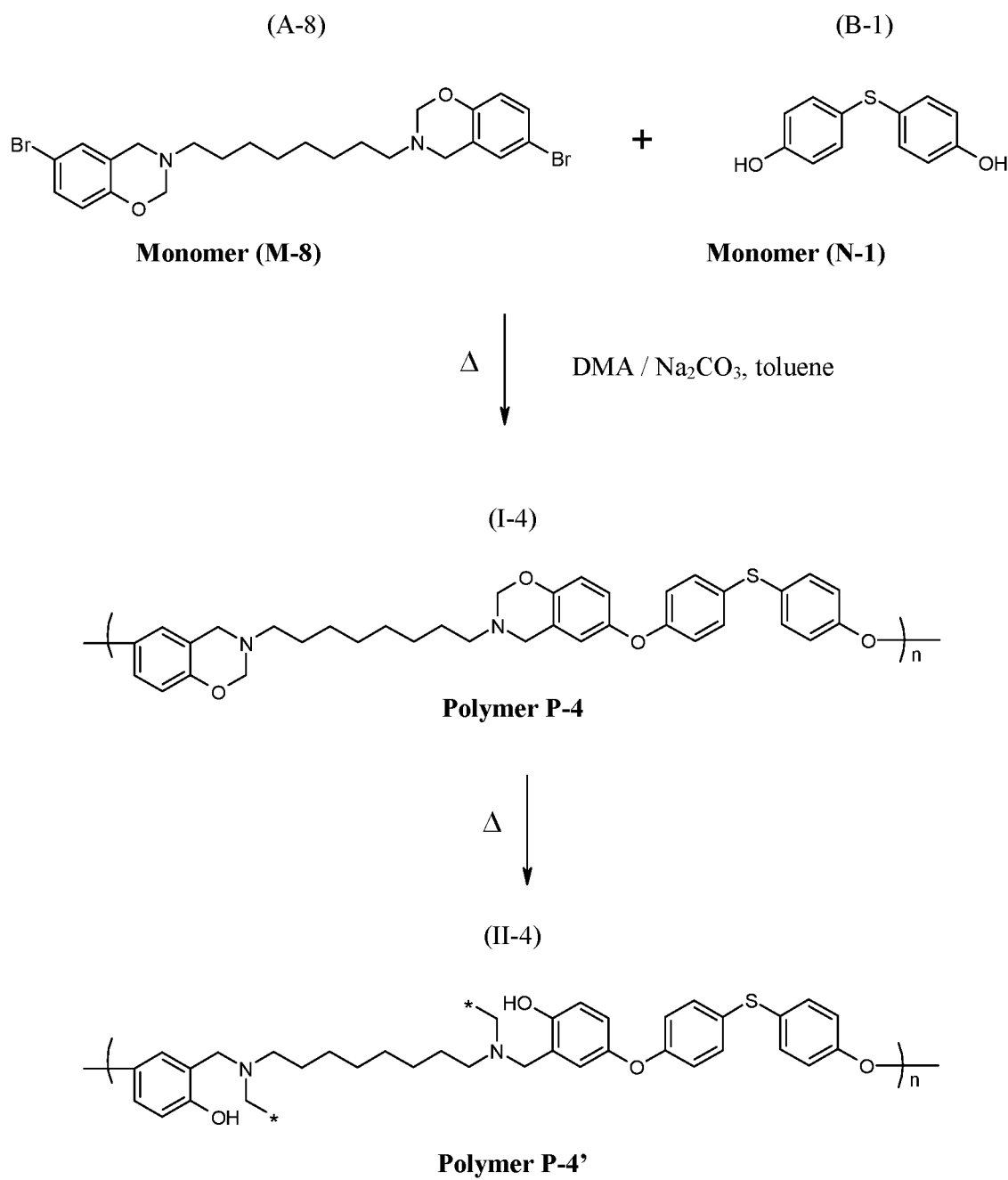
FIG. 17 the scheme for the synthesis of a particular polybenzoxazine (Polymer denoted by P-4) according to the invention, starting from the particular halogenated benzoxazine of formula (A-8) (Monomer M-8) from the preceding FIG. 15 and the particular monomer of formula (B-1) (Monomer N-1), and also the structure of this polymer once the oxazine rings thereof have been opened (Polymer denoted by P-4').

The Polymer P-4 from FIG. 17 was thus obtained, as attested to by the $^1$H NMR (500 MHz) analysis in the solvent DMA-d6, which gave the following results:

7.36-7.38 (d, 2H), 7.21-7.33 (m, 2H), 7.11-7.16 (m, 5H), 6.99-7.0 (s, 2H) 6.8-6.82 (d, 1H), 6.62 (s, 1H), 6.78-6.80 (d, 1H), 4.24 (s, 4H), 3.55-3.80 (m, 4H), 2.07-2.14 (m, 4H), 1.08-1.40 (m, 12H).

This Polymer P-4, in the form of a beige-coloured powder, was also analyzed by DSC (Differential Scanning calorimetry) between −80° C. and +260° C. with a ramp of 10° C./min (Mettler Toledo DSC "822-2" apparatus; nitrogen atmosphere). The analysis showed, in the first pass (between −80° C. and +260° C.) an exothermicity (corresponding to the opening of the oxazine rings, and to the crosslinking of the polymer) above 200° C., with a maximum at 240° C. During the second and third DSC passes conducted between −80° C. and +260° C., no apparent glass transition (Tg) was visible, which attests to the very high thermal stability of the polymer of the invention.

Test of Adhesion in a Metal/Rubber Composite

A portion (650 mg) of the Polymer P-4 previously prepared was dissolved in 8 ml of a toluene/DTP (1,3-dimethyl-3,4,5,6-tetrahydro-2(1H)-pyrimidinone; CAS 7226-23-5) mixture (in a 10:1 volume ratio), in order to form a slightly yellow transparent solution, a fraction (0.7 ml) of which was then deposited uniformly on a brass tape (film) having dimensions of 10 cm×2.5 cm and a thickness of 0.3 mm; the assembly was placed in an oven at 175° C. (with air ventilation) for 5 min, then an additional 5 min at 230° C. under vacuum in order, on the one hand, to eliminate any trace of solvent and, on the other hand, to at least partially open (i.e. completely or partially open) the oxazine rings of the polymer, this last step being accompanied by a pronounced change in the colour of the polymer, which changes to bright yellow.

After cooling to ambient temperature, the tape provided at the surface with its thin (5 to 10 µm thick) layer of polybenzoxazine thus formed, was then subjected to a conventional two-step adhesive coating operation (two bath adhesive coating), firstly by immersion in a first aqueous bath (around 94% water) based on epoxy resin (polyglycerol polyglycidyl ether, around 1%) and on isocyanate compound (caprolactam-blocked isocyanate compound, around 5%), which first adhesive coating step is followed by drying (2 min at 100° C.) then a heat treatment (5 min at 200° C.). Next, the tape thus treated was immersed in a second aqueous bath of RFL adhesive (around 81% by weight of water) based on resorcinol (around 2%), on formol (around 1%) and on a rubber latex (around 16% of NR, SBR and VP-SBR rubbers); finally it was dried in an oven for 2 min at 130° C., then heat treated for 5 min at 200° C.

The brass tape thus coated with the polybenzoxazine film then coated with adhesive, was subsequently placed between two layers of conventional rubber composition for a belt reinforcement of a passenger vehicle tyre, which composition is based on natural rubber, on carbon black and silica as filler and on a vulcanization system (sulfur and sulfenamide accelerator); this composition being devoid of cobalt salt. The metal/rubber composite test specimen thus prepared was then placed under a press and everything was cured (vulcanized) at 165° C. for 15 min under a pressure of 20 bar.

After vulcanization of the rubber, excellent adhesive bonding between the rubber matrix and metal tape was obtained, despite the absence of cobalt salt in the rubber matrix; this is because, during peel tests (at 20° C.), it was found that the failure occurred systematically in the rubber matrix itself and not at the interface between metal and rubber.

Other adhesive bonding tests were carried out on a(n) (uncoated) bright steel tape; they too revealed an excellent adhesion to the rubber (systematic failure in the rubber matrix).

In conclusion, the polybenzoxazine according to the invention gives the metal substrates the major advantage of being able subsequently to be adhesively bonded to rubber matrices using simple textile adhesives, such as RFL adhesives, or else directly (that is to say, without employing such adhesives) to these rubber matrices, for example when the latter contain appropriate functionalized unsaturated elastomers, such as epoxidized elastomers.

Thus, use may be made of metal substrates optionally coated with adhesive metal layers such as brass, and also surrounding rubber matrices devoid of metal salts, in particular of cobalt salts.

Moreover, this constituting a significant advantage compared to the other known polymers described in the introduction to the present document, the polybenzoxazines of the invention have the remarkable ability, at high temperature, to open their oxazine rings and to thus result in a thermosetting polyphenolic resin structure. This gives them a better thermal stability, with no visible phase transition at temperatures above 200° C. Lastly, their specific microstructure makes it possible, very advantageously, to adjust the flexibility of the molecule depending on the particular applications targeted.

The invention claimed is:

1. A polybenzoxazine, the repeat units of which comprise at least one unit corresponding to formulae (I) or (II):

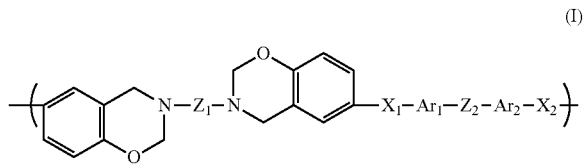

(I)

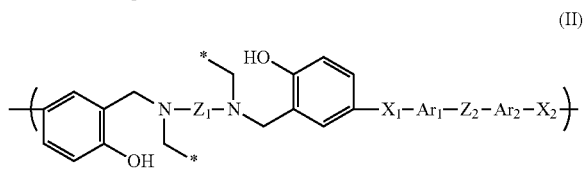

(II)

in which:

$Z_1$ represents an at least divalent, aliphatic, cycloaliphatic or aromatic bonding group comprising at least one carbon atom and optionally at least one heteroatom selected from O, S, N and P;

$X_1$ and $X_2$, which are identical or different, represent O or S;

$Ar_1$ and $Ar_2$, which are identical or different, represent a substituted or unsubstituted phenylene group; and $Z_2$ represents O or $(S)_n$, n representing an integer equal to 1 or greater than 1.

2. The polybenzoxazine according to claim 1, wherein $Z_1$ represents an aliphatic group comprising from 1 to 20 carbon atoms or a cycloaliphatic group comprising from 3 to 20 carbon atoms.

3. The polybenzoxazine according to claim 2, wherein $Z_1$ represents an aliphatic group comprising from 1 to 16 carbon atoms or a cycloaliphatic group comprising from 3 to 16 carbon atoms.

4. The polybenzoxazine according to claim 2, wherein $Z_1$ represents a $C_1$-$C_{20}$ alkylene group.

5. The polybenzoxazine according to claim 2, wherein $Z_1$ represents a $C_1$-$C_{16}$ alkylene group.

6. The polybenzoxazine according to claim 1, wherein $Z_1$ represents an aromatic group comprising from 6 to 30 carbon atoms.

7. The polybenzoxazine according to claim 1, wherein $Z_1$ represents an aromatic group comprising from 6 to 20 carbon atoms.

8. The polybenzoxazine according to claim 1, wherein $Ar_1$ and $Ar_2$ each represent an unsubstituted benzene ring.

9. The polybenzoxazine according to claim 1, wherein $X_1$ and $X_2$ each represent S.

10. The polybenzoxazine according to claim 1, wherein $X_1$ and $X_2$ each represent O.

11. The polybenzoxazine according to claim 9, wherein $Z_2$ represents O or S.

12. The polybenzoxazine according to claim 11, wherein $Z_2$ represents S.

13. The polybenzoxazine according to claim 10, wherein $Z_2$ represents O or S.

14. The polybenzoxazine according to claim 13, wherein $Z_2$ represents S.

15. The polybenzoxazine according to claim 10, wherein the repeat units comprise at least one unit corresponding to formulae (I-1) or (II-1):

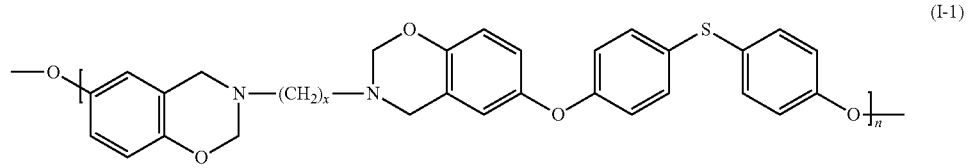

(I-1)

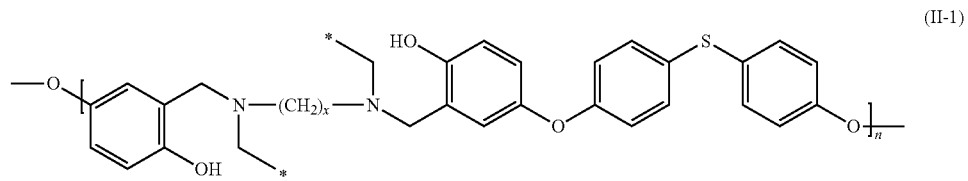

(II-1)

in which:
x is an integer varying from 1 to 16.

16. The polybenzoxazine according to claim 15, wherein x is an integer varying from 1 to 12.

17. The polybenzoxazine according to claim 13, wherein the repeat units comprise at least one unit corresponding to formulae (I-1) or (II-1):

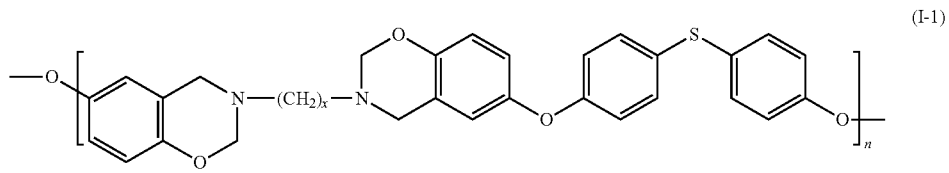

(I-1)

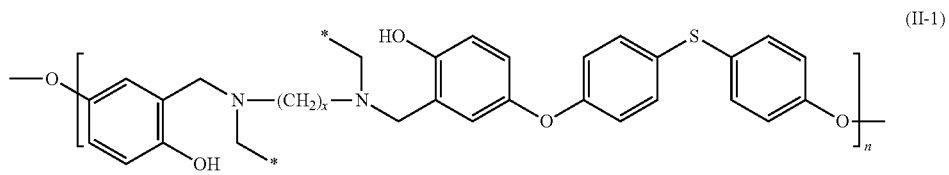

(II-1)

in which:
x is an integer varying from 1 to 16.

18. The polybenzoxazine according to claim 17, wherein x is an integer varying from 1 to 12.

19. A coating for a substrate, at least the surface of which is at least partially metallic, wherein the coating comprises the polybenzoxazine according to claim 1.

20. The coating according to claim 19, wherein the coating allows for adhesive bonding of the substrate to a rubber.

21. A substrate, at least the surface of which is at least partially metallic, wherein at least said metallic part is coated with a polybenzoxazine according to claim 1.

22. The substrate according to claim 21, wherein the substrate is made of steel.

23. The substrate according to claim 22, wherein the substrate is made of carbon steel.

24. The substrate according to claim 22, wherein the steel is a bright steel.

25. The substrate according to claim 22, wherein the steel is at least partially coated with at least one layer of a surface metal selected from the group consisting of aluminum, copper, zinc and alloys thereof.

26. The substrate according to claim 25, wherein the surface metal is brass.

\* \* \* \* \*